(12) United States Patent
Miyawaki et al.

(10) Patent No.: US 6,204,913 B1
(45) Date of Patent: Mar. 20, 2001

(54) PHOTOGRAPHIC PROCESSING APPARATUS

(75) Inventors: Hiroshi Miyawaki; Masayuki Tamai; Kimiharu Ohtani, all of Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 0 days.

(21) Appl. No.: 09/276,145

(22) Filed: Mar. 25, 1999

(30) Foreign Application Priority Data

Mar. 25, 1998 (JP) .................................................. 10-077998
Jun. 5, 1998 (JP) .................................................. 10-157996

(51) Int. Cl.[7] .................................................. G03B 27/54
(52) U.S. Cl. .................................................. 355/67; 355/71
(58) Field of Search .................................. 355/67, 68, 69, 355/70, 71, 32

(56) References Cited

U.S. PATENT DOCUMENTS

| | | | |
|---|---|---|---|
| 3,920,320 | * 11/1975 | Ellis et al. | 355/70 |
| 4,023,903 | * 5/1977 | Scheib | 355/71 |
| 4,143,966 | * 3/1979 | Gandini | 355/67 |
| 4,184,763 | * 1/1980 | Handsman et al. | 355/67 |
| 4,893,149 | 1/1990 | Satou et al. | 355/67 |
| 5,008,701 | 4/1991 | Tokuda | 355/35 |
| 5,617,184 | 4/1997 | Kuwayama et al. | 355/75 |
| 5,842,761 | * 12/1998 | Futakami et al. | 353/119 |
| 5,850,281 | * 12/1998 | Benker | 355/71 |

FOREIGN PATENT DOCUMENTS 8082869    3/1996 (JP).

* cited by examiner

Primary Examiner—Alan A. Mathews
(74) Attorney, Agent, or Firm—Smith Patent Office (57) ABSTRACT

The present invention provides a device for uniformly irradiating the surface of the negative film without making the size of the mirror tunnel larger. The invention also makes the size of the device smaller and reduces electric power consumption. A fly eye lens is used as a diffuser plate of the light incoming side of a mirror tunnel. The fly eye lens has a plurality of micro-lenses arranged on a transparent substrate for forming concave and convex shapes on the surface thereof facing the diffuser so as to lead the incident light into the mirror tunnel. Thereby, the light incident to the fly eye lens is hardly diffused out of the area of the mirror tunnel and the loss in the quantity of light is reduced. In addition, since the fly eye lens uniformly disperses the incident light onto the surface of the photo film, the light can be uniformly irradiated onto the surface of the photo film even if the incident light is not strongly diffused by the diffuser and the mirror tunnel. The first and second fly eye lenses and the first and the second condenser lenses are disposed in the optical path between the halogen lamp and the negative film. The light irradiated from the halogen lamp is made uniform by the first and the second fly eye lenses, and it is then condensed by condenser lenses, and then it is irradiated onto the original image on the negative film.

6 Claims, 9 Drawing Sheets

PHOTOGRAPHIC PROCESSING APPARATUS

BACKGROUND OF THE INVENTION

1. Field of the Invention

The present invention relates to a photographic processing apparatus such as a photographic processing device or photographic printer. In particular, the present invention relates to a photographic processing apparatus having a mirror tunnel for diffusing light from a light source and then leading it onto a film negative. In addition, the present invention relates to a light source device for irradiating light from a light source onto a film negative during a scanning or printing processes.

2. Discussion of the Related Art

Figure 5:
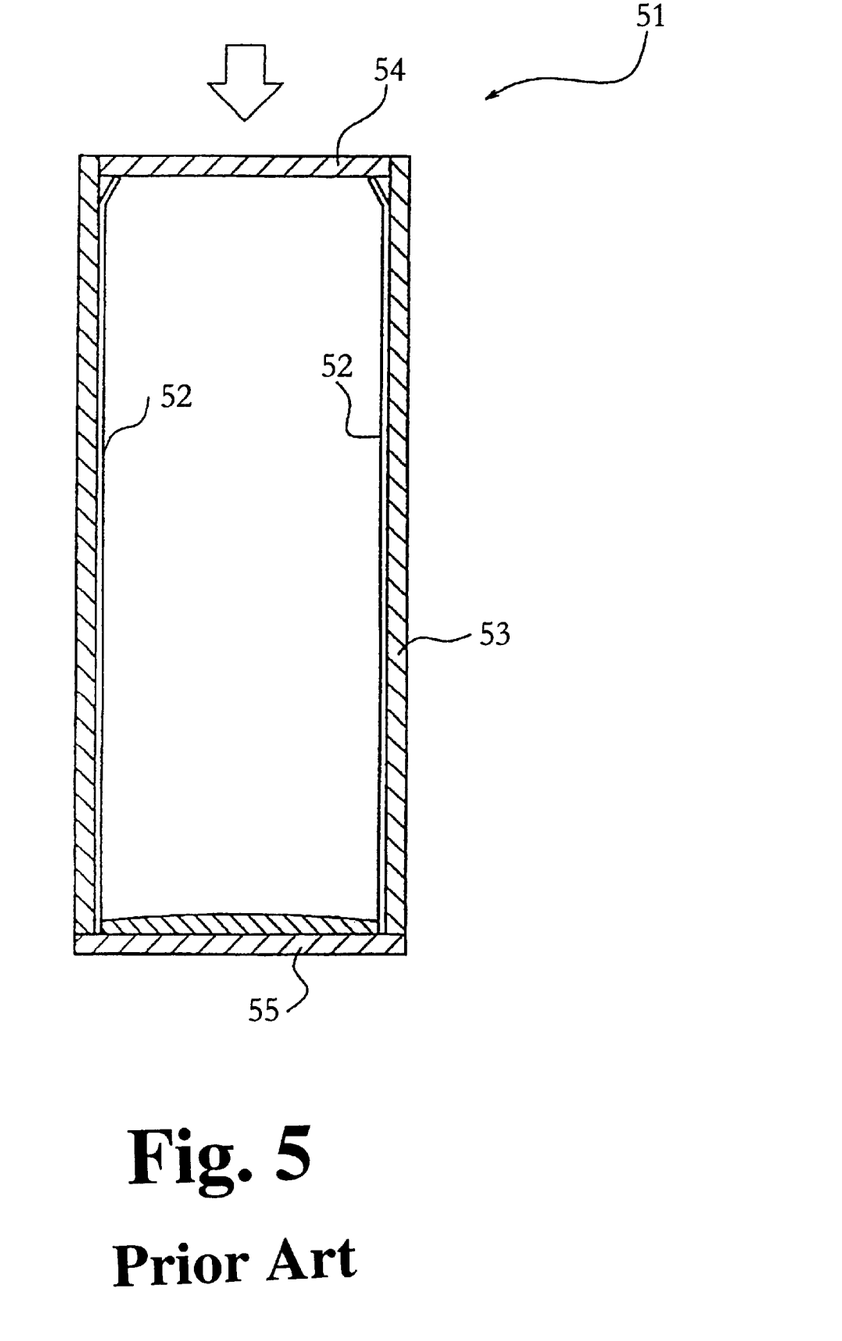
FIG. 5 is a cross sectional view illustrating a conventional mirror tunnel.

Various photo processing apparatuses have been proposed for irradiating light from a light source such as a halogen lamp onto a negative and printing an image of the negative onto a photosensitive material. These photo processing apparatuses are generally provided, for example, with a mirror tunnel 51 shown in FIG. 5 on an optical path between the light source and the film negative. FIG. 5 shows a general structure of a mirror tunnel 51 which is referred to, for example, in Japanese Patent Provisional Publication No. 82869 (1996).

The mirror tunnel 51 comprises a cylindrical mirror tunnel main body 53 having a light reflecting surface 52 formed on the inner surface thereof and diffuser plates 54 and 55, each being disposed on the light incoming side and light outgoing side of the mirror tunnel main body 53 respectively. The diffuser plates 54 and 55 are made of, for example, ground glass or resin such as PMMA (methacrylic resin) and the like containing an opaline pigment.

Due to the structure described above, the light from the light source is diffused by the diffuser plate 54 disposed on the light incoming side of the mirror tunnel 51 as it enters the mirror tunnel 51. Then the incident light is reflected and diffused by the light reflecting surface 52 in the mirror tunnel 51. After having been re-diffused by the diffuser plate 55 disposed on the light outgoing side of the mirror tunnel 51, the light radiates onto the film negative. Even if a point light source such as a halogen lamp and the like is used, the film negative can be substantially uniformly exposed by irradiating the diffused light using the mirror tunnel 51, so that non-uniform exposure between the optical axis and its periphery can be minimized.

Various light source devices have been proposed for irradiating light from a light source onto a film negative during the process of scanning a photo film or of printing it on a photosensitive material such as photographic printing paper. In these light source devices, a halogen lamp is generally employed as a light source.

Light irradiated from a halogen lamp is non-uniform in quantity due to the shape of the filament or an effect of the reflector. On the other hand, the negative film requires uniform light to be irradiated over the entire image area. Therefore, the light source device is inevitably required to be provided with a structure for making the light from the halogen lamp uniform between the halogen lamp and the film negative.

For uniformalizing light (making the light from the halogen lamp uniform), for example, a structure including an optical condenser lens and an optical diffuser means arranged in this order between the halogen lamp and the negative film is employed. According to this structure, the light irradiated from the halogen lamp is condensed by the condenser lens, and the condensed light is diffused by the optical diffuser means. Thereby uniform light is irradiated onto the film negative. As for the optical diffuser means, for example, a mirror tunnel 51 shown in FIG. 5 is used.

Since the diffuser plate 54, as described above, is made of ground glass having opaline materials, the quantity of light is lowered by some one-tenth when light from the light source is transmitted through the diffuser plate 54, and the same degree of drop in the quantity of light also occurs in the diffuser plate 55.

On the other hand, when the light source having the structure described above is used, for example, in a scanner, the light irradiated onto a negative film is detected by a CCD (Charge-Coupled Device). The CCD provides an image with wider contrast when the quantity of light received from the image is widely dispersed within a range of the uppermost and the lowermost limits of a sensor of the quantity of light. This means that the light irradiating the negative film is required to have a certain quantity of light.

Therefore, in the structure of the conventional photo processing apparatus, the power of the halogen lamp is increased in order to compensate for decreased quantity of light which occurs when the light from the light source passes through two diffuser plates 54, 55. As a result, there are problems with increased power consumption of the halogen lamp and an increased cost of the halogen lamp.

At the same time, there is also a problem of an increased quantity of heat discharged from the halogen lamp due to the increased power of the halogen lamp. This requires a cooling device, for example, a fan for cooling the inside of the light source resulting in an additional increase in power consumption.

Since non-uniformity in illuminance on the film negative increases when the power of the halogen lamp is increased, light diffusion by the light diffuser means has to be further enhanced. For example, in the case described above, the diffuser plates 54, 55 of the mirror tunnel 51 may be thickened to enhance the diffusion effect in the mirror tunnel 51. However, the thicker diffuser plates 54, 55 make the quantity of light lower, and this requires a higher capacity light source.

As an alternative method for preventing non-uniformity in the illuminance on the negative film, the mirror tunnel 51 may be formed longer along an optical axis to increase reflection times in the mirror tunnel 51 and thereby enhance the diffusion effect. However, this method makes the mirror tunnel 51 larger and therefore causes a problem due to the larger size requirement for the light source device itself.

SUMMARY OF THE INVENTION

The present invention is provided to solve the problems described above, and accordingly an object thereof is to provide a photo processing apparatus which enables uniform irradiation on the surface of the film negative without increasing the size of the mirror tunnel so it thereby allows for down-sizing of the device and a reduction in electric power consumption.

In order to solve the above noted problems, the invention provides a photo processing apparatus comprising a diffuser means including a cylinder on whose inner surface is formed a light reflection surface and two diffuser plates each disposed in an end opening of the cylinder. This allows light to be irradiated from a light source through both diffuser plates and the reflection surface onto a photographic film where an original image is recorded. One diffuser plate is disposed on the light incoming side of the diffuser means and has a regularly formed concave and convex shapes thereon so that incident light may pass inside said diffuser means.

According to the structure described above, light from the light source is irradiated onto the film after having been diffused by the diffuser on the light incoming side, the light reflection surface on the inner surface of the cylinder and the diffuser on the light outgoing side. By irradiating the light from the light source onto the photo film through the diffuser means as described above, non-uniformity in the exposure caused by the difference in the quantity of light between the central part and the periphery of the film can be minimized to the greatest extent possible. Thereby substantially uniform light is irradiated over the entire film. Then the original image recorded on the photo film is printed, for example, on the photosensitive material such as photographic printing paper.

Since the diffuser plate disposed on the light incoming side has a regularly formed concave and convex surfaces thereon, the incident light is refracted on each concave and/or convex surface so as to pass inside the diffuser means. Therefore, although some part of the light is diffused outside of the necessary area of the diffuser means when a conventional diffuser plate diffuses the incident light by making it impinge on opaline pigments, in the present invention, only a very small part of the incident light is diffused outside the necessary area by the diffuser plate on the light incoming side.

Thus, the loss in the quantity of incident light entering into the diffuser means is decreased. Further, a reduction in the light quantity caused by transmitting the light from the light source through both diffuser plates respectively disposed on the light incoming side and on the light outgoing side of the diffuser means is not as great as with the conventional device. As a result, the power of the light source does not need to be increased too much. In addition, since the diffuser plate on the light incoming side has a surface with concave and convex shapes regularly formed thereon and since it uniformly disperses the incident light onto the surface of the photo film, a substantially equivalent diffusion effect to that of the conventional opaline diffuser plate is ensured. Therefore, according to the structure described above, electric power consumption can be decreased while keeping the same degree of diffusion as in a conventional device. In addition, a reduction in the quantity of the incident light is avoided.

In addition, since the diffuser on the light incoming side has the characteristics described above, the light can be substantially uniformly irradiated onto the surface of the photo film even if the incident light is not strongly diffused by the diffuser plate on the light outgoing side and in the diffuser means. This allows the diffuser plate on the light outgoing side to be formed thinner and also allows the diffuser means to be made smaller by making its length shorter. Therefore, the apparatus itself may be made smaller and space saving because the diffuser means has the diffuser plate on the light incoming side described above.

In order to solve the problem above, the invention also provides a photo processing apparatus in which the diffuser plate disposed on the light incoming side comprises a plurality of the micro-lenses arranged two-dimensionally on the surface of a transparent substrate. According to the structure described above, the diffuser plate on the light incoming side has a surface with concave and convex surfaces regularly formed thereon. Since both the substrate and the micro-lenses are transparent, the transmittance of the diffuser plate on the light incoming side is greatly improved compared with the case where the diffuser plate on the light incoming side is an opaline diffuser plate.

Therefore, according to the structure described above, the loss in the quantity of light can be further decreased, and, as a result, the power consumption of the light source can also be reduced.

In order to solve the problems above, the invention further provides a light source device comprising a light source, an optical uniformalizer means for uniformalizing light irradiated from the light source (a means for making uniform light from light irradiated from the light source), and an optical condenser means for condensing the uniform light (uniformalized by said optical uniformalizer means), wherein the means for making uniform light comprises a plurality of micro-lenses formed on a surface of a transparent substrate so as to lead incident light into the incoming side area in the optical condenser means.

According to the structure described above, since the optical uniformalizer means (means for making uniform light) comprises a plurality of micro-lenses formed on the surface of the transparent substrate so as to lead the incident light into the incoming side area in the optical condenser means, most of the light whose non-uniform quantity is removed by this means is supplied as incident light onto the optical condenser means. Therefore, since the light is not diffused out of the necessary area, which might be caused by the conventional diffuser plate made of ground glass, resin containing opaline pigment and the like, the loss in the quantity of light supplied to the optical uniformalizer means (means for making uniform light) can be greatly decreased.

In addition, the uniform light (uniformalized by the optical uniformalizer means) is condensed by the optical condenser means to be irradiated onto the object to be illuminated, such that the light can be irradiated only onto the area necessary for illumination.

In addition, the light irradiated by the light source is condensed by the optical condenser means after the non-uniformity in the quantity of light has been removed by the optical uniformalizer means. Thus the non-uniformity in the light quantity of the light irradiated onto the object to be illuminated can be efficiently removed. For example, in the case where the light irradiated from the light source is condensed by an optical condenser means and then is supplied onto an optical uniformalizer means, the light which is condensed and thereby decreased in a section area of luminous flux is supplied onto the optical uniformalizer means. In this case, the light is transmitted through only a part of the optical uniformalizer means to be uniformalized, which deteriorates the efficiency in making the light uniform. On the other hand, the structure described above allows the light irradiated from the light source to be supplied over almost the full area of the optical uniformalizer means, and it is then condensed by the optical condenser means, so that the light can be efficiently made uniform.

Therefore, according to the structure described above, the loss in quantity of light irradiated from the light source may be minimized, and light with little non-uniformity may be irradiated onto the object to be illuminated, so that a light source device capable of maximizing the light source can be achieved. The invention further provides a light source device further comprising a heat reflector means which reflects infrared rays and transmits visible light and a heat transmitter means which transmits infrared rays and reflects visible light, each being disposed between the light source and the optical condenser means, wherein the light transmitted through the heat reflector means and reflected by the heat transmitter means is used to illuminate an object.

According to the structure described above, since the light transmitted through the heat reflector means and reflected by the heat transmitter means is used as an illumination light, most of the infrared ray components included in the light irradiated from the light source can be removed. Consequently, the rise in temperature in the object to be illuminated can be greatly reduced.

The invention further provides a light source device further comprising a reflector for reflecting the light irradiated from the light source approximately toward a desired direction, wherein the light source is directly fixed to the reflector.

According to the structure described above, since the light source is directly fixed to the reflector, the relationship between the emitter point of the light source and the curvature of the reflecting surface of the reflector can be precisely controlled. In addition, the proper arrangement of the light source and the reflector can be easily determined while assembling or replacing these components.

Other objects, features and advantages of the invention will be apparent from the following detailed description taken in conjunction with the accompanying drawings wherein preferred embodiments of the invention have been selected for exemplification and from the individual features and relationships of the respective appended claims.

BRIEF DESCRIPTION OF THE DRAWINGS

The above and other objects and features of the present invention will be clearly understood from the following description with respect to a preferred embodiment thereof when considered in conjunction with the accompanying drawings, wherein the same reference numerals have been used to denote the same or similar parts or elements, and in which:

FIGS. 6A, 6B and 6C are plan views of the first, the second and the third rotary plate assemblies respectively.

FIGS. 6D and 6E are cross sectional views of the second and third rotary plate assemblies as shown in FIGS. 6B and 6C.

DETAILED DESCRIPTION OF THE PREFERRED EMBODIMENTS

While this specification concludes with claims defining the features of the invention that are regarded as novel, it is believed that the invention will be better understood from a consideration of the following description in conjunction with the drawing figures, in which like reference numerals are carried forward.

Figure 2:
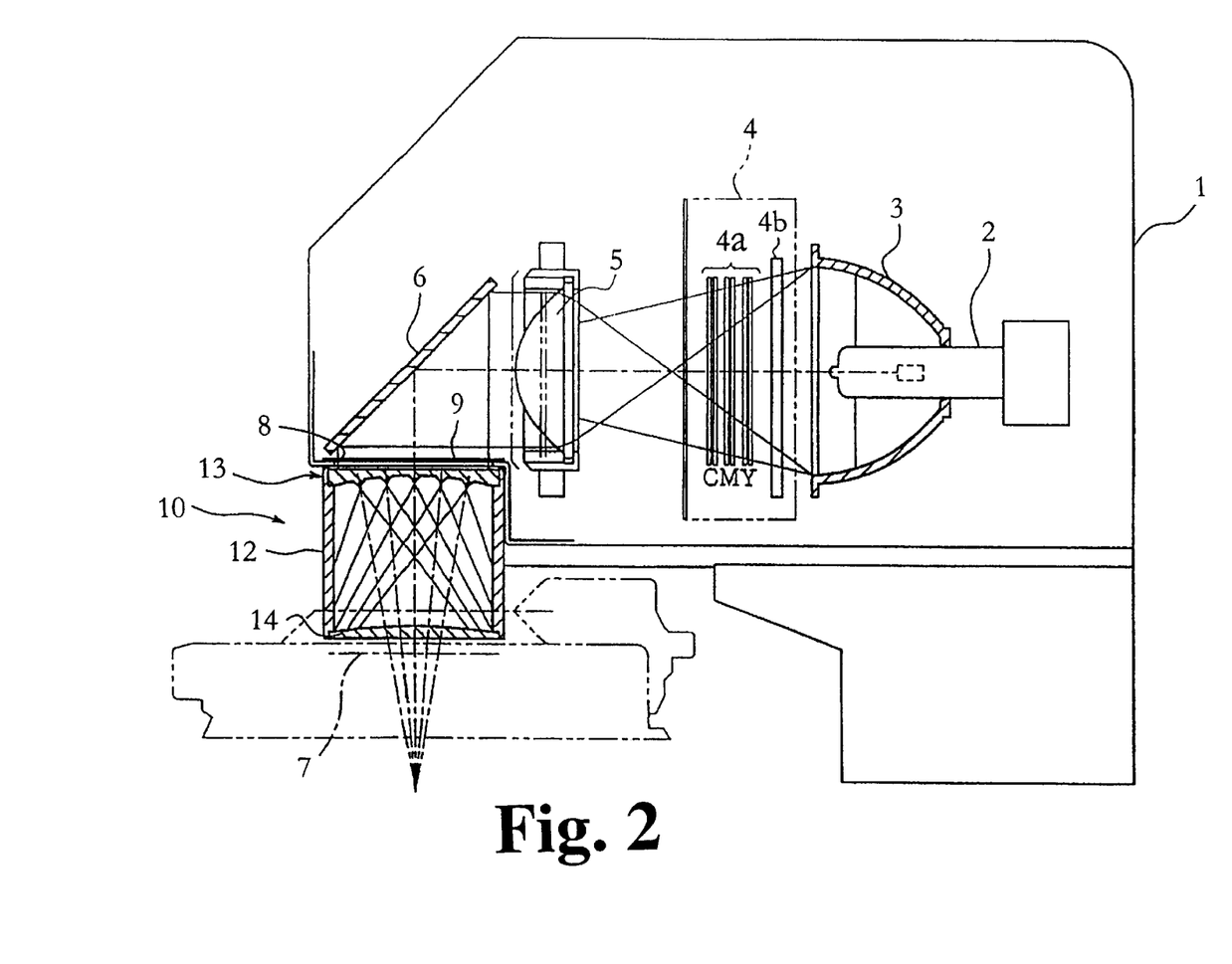
FIG. 2 is a cross sectional view illustrating a general structure of the present photo processing apparatus according to the present invention.

A photo processing apparatus according to the present embodiment has, as shown in FIG. 2, housing 1 as a lamp box. In the housing 1, there are installed a halogen lamp 2 as a light source, a reflector 3, a light modification unit 4, a condenser lens 5 and a cold mirror 6. The light modification unit 4, the condenser lens 5 and the cold mirror 6 are arranged on an optical axis connecting the halogen lamp 2 to a negative film 7 which is conveyed to a predetermined position out of the housing 1, in this order along the irradiation direction of the light from the halogen lamp 2.

The halogen lamp 2 is a light source for irradiating light onto the negative film 7 and thereby printing an original image recorded on the negative film 7 to a photosensitive material such as a photographic printing paper. It may also be used for scanning the negative film 7 (data sampling).

The reflector 3 is formed into a concave shape around the halogen lamp 2 so as to reflect incident light from the halogen lamp 2 to irradiate forward (toward light modification unit 4) as well as to condense it. The light modification unit 4 comprises a light modification filter 4a for respective colors of Y (yellow), M (magenta) and C (cyan), and a heat reflection filter 4b which reflects heat and transmits visible light.

The condenser lens 5 changes the incident light into parallel rays. The cold mirror 6 reflects only visible light toward the negative film 7.

On the housing 1 is formed an opening 8 for allowing light to pass through from the cold mirror 6 to the negative film 7. A dust-tight glass 9 having an outer diameter slightly larger than the inner diameter of the opening 8 is disposed on an inner surface of the body 1 so as to cover the opening 8.

Between the housing 1 and the negative film 7 and on the optical axis connecting the halogen lamp 2 to the negative film 7, a mirror tunnel 10 (optical diffuser means) is disposed which diffuses the light from the halogen lamp 2 so as to irradiate it onto the negative film 7, in order to reduce non-uniformity in the exposure of the negative film 7. The mirror tunnel 10 comprises, as shown in FIG. 1B, a cylinder 12 on whose inner surface is formed a mirror 11 (light reflection surface), a fly eye lens 13 (diffuser plate on the light incoming side) as a diffuser plate, and a diffuser 14, each of the latter two being disposed respectively on both openings of the cylinder. The cylinder 12 is formed to have an approximately square section.

The diffuser 14 is a conventional diffuser plate made of, for example, ground glass or PMMA (methacrylic resin) containing opaline pigment, and is disposed on the light outgoing side opening of the cylinder 12 so as to work as a diffuser on the light outgoing side.

The fly eye lens 13 has a shape slightly larger than the inner diameter of the opening 8 shown in FIG. 2, and is disposed on the light incoming side opening of the cylinder 12, adjacent to the body 1 so as to cover the opening 8 from the outside of the body 1.

Figure 1A:
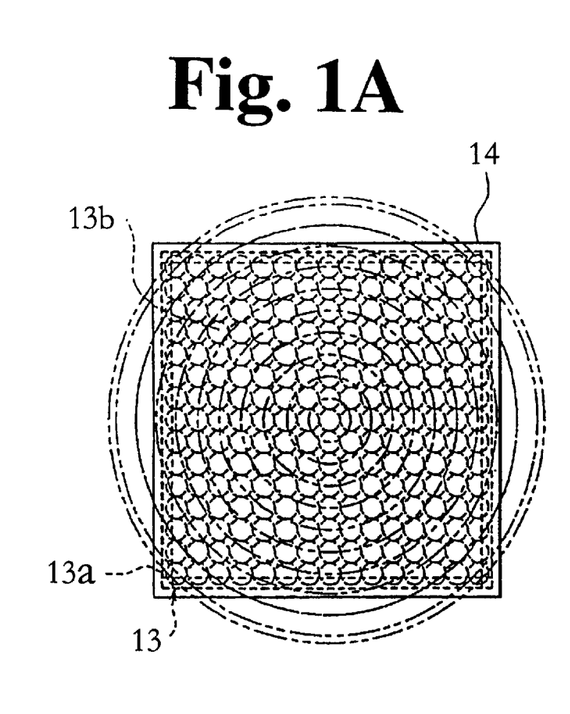
FIG. 1A is a plan view of the mirror tunnel employed in the photo processing apparatus according to the present invention, as viewed from the light outgoing side.
Figure 1B:
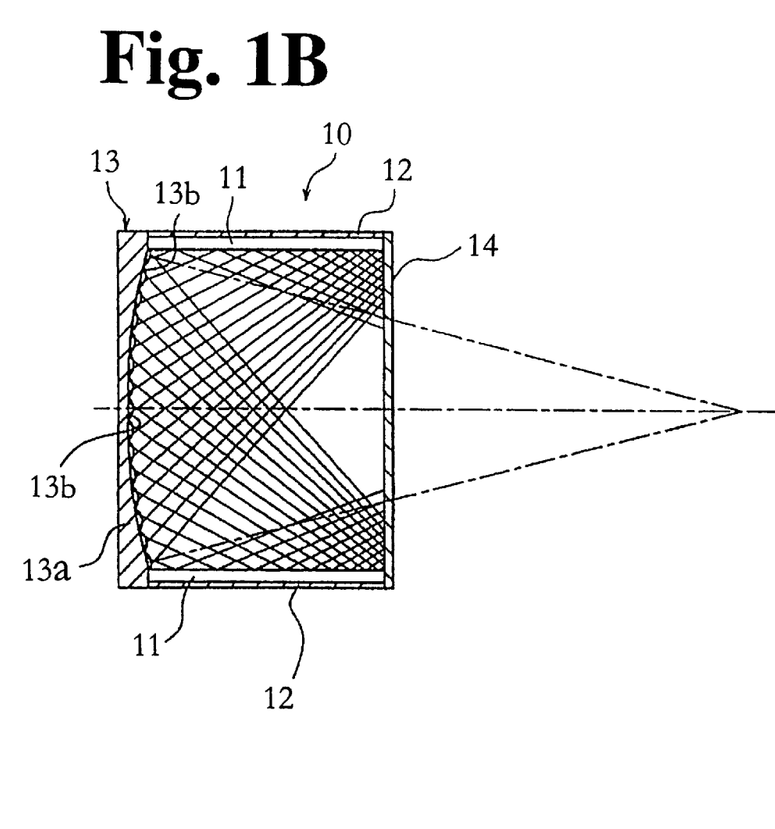
FIG. 1B is a cross sectional view of the mirror tunnel along a plane cut parallel to the optical axis.

As shown in FIGS. 1A and 1B, the fly eye lens 13 contains a transparent substrate 13a and a plurality of micro-lenses 13b formed integrally on the transparent substrate 13a, and is transparent because no opaline pigment is contained therein. In the present embodiment, each of the micro-lenses 13b has the same shape and is two-dimensionally arranged on the surface of the transparent substrate 13a, which faces the diffuser 14, taking the focus of each lens into consideration. Thereby, the fly eye lens 13 has a surface with regularly formed concave and convex shapes so as to lead the incident light into the mirror tunnel 10.

Due to the structure of the fly eye lens 13, the incident light to the fly eye lens 13 is refracted and diffused on the surface of the fly eye lens formed into concave and convex shapes. Thus the light incident to the fly eye lens 13 is dispersed by a plurality of micro-lenses 13b. As a result, the fly eye lens 13 has the same function as the surface light source due to an operation of the micro-lenses 13b. In addition, since the fly eye lens 13 comprises the substrate 13a and the micro-lens 13b, both being transparent, a transmittance equal to or more than 90% is attained.

The surface of the transparent substrate 13a on which micro-lenses 13b are formed is designed to be concave so that the centerline of the micro-lens 13 intersects the optical axis. Thereby, the light transmitted through the micro-lenses 13b can be reliably led to the periphery of the diffuser 14 and then to the periphery of the negative film 7 (see FIG. 2).

A plurality of concentric circles in FIG. 1A shows that the surface of the transparent substrate 13a on which micro-lens 13b is formed is designed to be concave. In addition, since a heat reflecting coating is applied to the surface of the fly eye lens 13, the heat rays are further prevented from radiating to the negative film 3 and the temperature rise thereon is controlled as well.

Then, the operation of the photo processing apparatus according to the present invention having the structure above will be described with reference to FIGS. 1A, 1B and 2.

The light irradiated from the halogen lamp 2 with a solid angle of 360 degrees is reflected forward by the reflector 3, condensed and enters into the light modification unit 4. In the light modification unit 4, part of the infrared components are removed by the heat reflection filter 4b while the visible light is transmitted through the heat reflection filter 4b and then the color balance of Y, M and C colors is adjusted by the light modification filters 4a.

The light irradiated from the light modification unit 4 is changed into parallel rays by the condenser lens 5 and is reflected by the cold mirror 6 toward the negative film 7. A part of the heat rays contacting the cold mirror 6 pass through the cold mirror 6 and exit out of the optical path. The light reflected by the cold mirror 6 passes through the dust-tight glass 9 and the opening 8 in order and then enters the fly eye lens 13 disposed on the light incoming side of the mirror tunnel 10. The light incident to the fly eye lens 13 is refracted and diffused on the surface of the fly eye lens 13 and is led into the mirror tunnel 10.

Since the fly eye lens 13 has a surface with regularly formed concave and convex shapes, the light diffused by the concave and convex portions is reliably led into the mirror tunnel 10. Different from the conventional opaline diffuser plate that diffuses the incident light by making it impinge onto the opaline pigments therein, the fly eye lens 13 leads the incident light into the mirror tunnel 10 by refracting and diffusing it at the concave and convex portion on the surface of the fly eye lens 13 formed by the micro-lenses 13b. As a result the incident light is hardly diffused out of the necessary area of the mirror tunnel 10, and accordingly the loss in the quantity of light is small.

After that, the incident light is further diffused through a plurality of reflections by the mirror 11 on the inner surface of the mirror tunnel 10 and then it goes into the diffuser 14. The incident light going into the diffuser 14 is furthermore diffused by impinging on opaline pigments in the diffuser 14 and is irradiated from the mirror tunnel 10 toward the negative film 7. As a result, uniform light is supplied onto the negative film 7 to reduce non-uniformity in the exposure on the surface of the negative film 7.

As described above, since, in the present invention, the fly eye lens 13 is employed as a diffuser plate on the light incoming side, the loss in the quantity of the incident light to the mirror tunnel 10 is reduced, so that the reduction of the quantity of the light passing through the mirror tunnel 10 is not as great as with conventional systems. As a result, the halogen lamp 2 does not need to have the power increased too much.

Since the fly eye lens 13 is figured into regularly formed concave and convex shapes thereon by arranging the micro-lenses 13b, and this uniformly disperses the incident light, the same degree of diffusion effect can be achieved as in the case where a conventional opaline diffusion plate is employed.

Therefore, according to the structure described above, a reduction in the quantity of incident light can be avoided, and thereby the electric power consumption of the halogen lamp 2 can be reduced while maintaining substantially the same degree of diffusion effect as the conventional device. Because of the structure of the fly eye lens 13 according to the present invention, in which the micro-lenses 13 are formed integrally with the transparent substrate 13a, errors in the mutual arrangement and in the focal distance of the lens can be lowered compared with the case where the transparent substrate 13a and the micro-lenses 13b are formed separately and then both are adhered to make the fly eye lens 13. Accordingly, errors in lens design can be minimized, and the desired diffusion effect can be attained. The integrally formed structure of the fly eye lens 13 makes its production easier and enables mass-production, and the cost effectiveness of the fly eye lens 13 will be improved.

Next the reason why the fly eye lens 13 is employed as the diffuser plate disposed on the light incoming side of the mirror tunnel 10 will be described.

The fly eye lens 13 is an assembly of a plurality of micro-lenses 13b and, since it can irradiate uniform light two-dimensionally by dispersing the incident light as described above, it is generally used by itself as an element of the light source of, for example, a reflector type large screen TV of projector type, a personal computer, a word processor, a copy projector, etc. Thus, it might be easy to maintain the same degree of diffusion effect as a conventional opaline diffuser plate by employing, as in the present invention, the fly eye lens 13 having the dispersing operation as the diffuser plate disposed on the light incoming side of the mirror tunnel 10.

However, when the fly eye lens 13 is applied to the mirror tunnel 10, since the incident light is dispersed by the fly eye lens 13 without causing a loss in the quantity of light, approximately uniform illuminance can be supplied onto the surface of the negative film even if the incident light is strongly diffused by the diffuser 14 or in the mirror tunnel 10. Conventionally, in order to secure the uniform illuminance on the surface of the negative film, the diffusion effect is enhanced by, for example, forming the mirror tunnel 10 much longer along the optical axis or making another diffuser plate (diffuser 14) thicker. In contrast, the present invention does not require such means to enhance the diffusion effect but rather allows the diffuser 14 to be made thinner or the mirror tunnel 10 to be made shorter.

Thus, the mirror tunnel 10 can be made compact by employing the fly eye lens 13 as a diffuser plate on the light incoming side of the mirror tunnel 10, and thus the apparatus itself may be made smaller to save space. This effect can be accomplished when the fly eye lens 13 is combined with the mirror tunnel 10, so that it could not be derived from individual structures separately.

Though the above description shows an example in which the fly eye lens 13 is applied to the diffuser plate on the light incoming side of the mirror tunnel 10, it is not limited to the fly eye lens 13. As the diffuser plate on the light incoming side, any diffuser plate can be employed as long as it has a concave and convex surface so as to control the direction and distribution of the light and refracts and diffuses the incident light (hereafter, such diffuser plate will be referred to as surface diffuser plate).

As for the surface diffuser plate, there is a surface diffuser plate made by Physical Optics Corporation, on which is formed a random pattern of 5ƒÊm grooves having a function equivalent to that of the concave lenses. Further, another surface diffuser plate which has a saw-tooth like section such as a Fresnel lens and has a circular belt like groove formed thereon in plan view (which is not a Fresnel lens itself) may be employed.

In the present invention, though each of the micro-lenses 13b formed on the fly eye lens 13 has been described so as to have a common shape, it is not limited thereto. Each micro-lens 13b may be formed to have different shapes from each other. With these structures, since the incident light is not diffused out of the necessary area of the mirror tunnel 10, the same effect as the present invention will be accomplished.

In the present invention, though the surface of the transparent substrate 13a on which micro-lenses 13b are formed has been described as concave, it may be flat, and in this case it is a matter of course that the same effect as the present invention will be accomplished.

In the present invention, though the fly eye lens 13 has the micro-lenses 13b integrally formed with the transparent substrate 13a, the fly eye lens 13 may be structured by forming them separately and then adhering them together. In this case, the micro lenses 13b are arranged on the transparent substrate 13a with a great degree of accuracy.

As described above, in the photo processing apparatus according to the invention, the diffuser plate on the light incoming side has concave and convex shapes regularly formed thereon so as to lead the incident light into the diffuser means.

Therefore, the loss in the quantity of the incident light into the diffuser means is decreased, and the reduction in the light quantity which occurs when the light from the light source passes through the diffuser plates disposed on the light incoming side and the light outgoing side of the diffuser means is not as great as with the conventional device. As a result, the light source need not increase its power too much. In addition, since the diffuser plate on the light incoming side has a surface with concave and convex shapes regularly formed thereon and thereby uniformly disperses the incident light onto the surface of the photo film, a substantially equivalent diffusion effect as that of the conventional opaline diffuser plate is ensured.

Another preferred embodiment of the present invention will be described with reference to FIG. 3.

Figure 3:
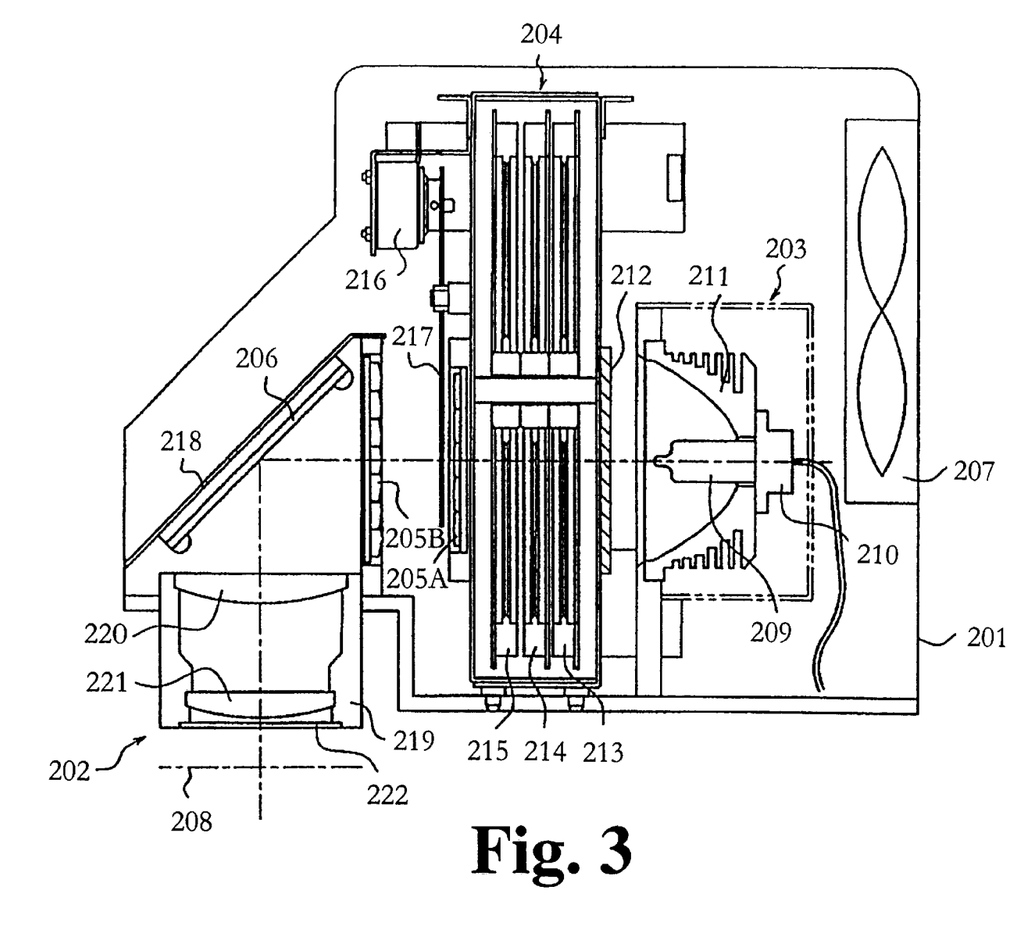
FIG. 3 is a plan view illustrating additional details of the photo processing apparatus of the present invention.

A light source device according to the present embodiment comprises, as shown in FIG. 3, a housing 201 as a lamp box and a condenser lens unit 202. In the housing 201, there are installed a light source section 203, a filter unit 204, first and second fly eye lenses (optical uniformalizer means) 205A, 205B, a cold mirror (heat transmitter means) 206, and a cooling fan unit 207. The filter unit 204, the first and the second fly eye lenses 205A, 205B, the cold mirror 206 and the condenser lens unit 202 are arranged on an optical axis connecting the light source section 203 to a negative film 208 which is conveyed to a predetermined position out of the light source device, in this order along the irradiation direction of the light from the light source section 203.

Though the light source device of the present embodiment is used as a light source device for irradiating the light onto the negative film 208 and detecting an original image recorded on the negative film 208 by CCD, this can also be applied also to a light source device for printing it onto a photosensitive material such as photographic printing paper.

The light source section 203 contains a halogen lamp (light source) 209, h eat sink 210 and a reflector 211.

Figure 4A:
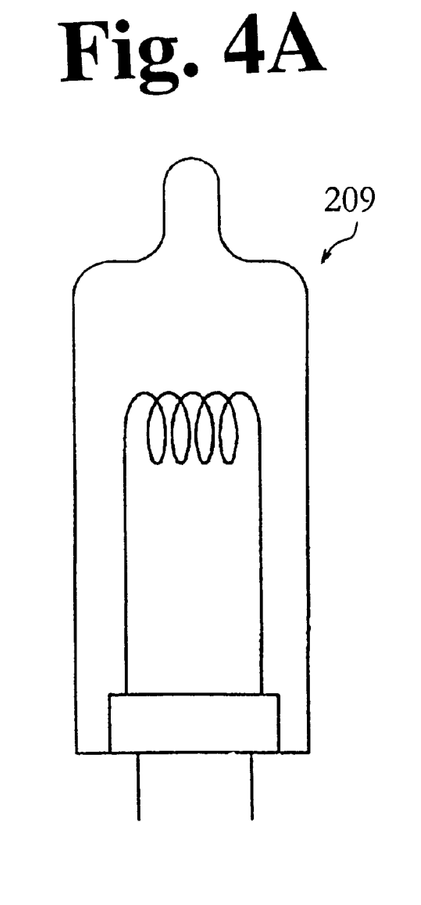
FIGS. 4A to 4C are diagrammatic illustrations of various filaments of the halogen lamps.
Figure 4B:
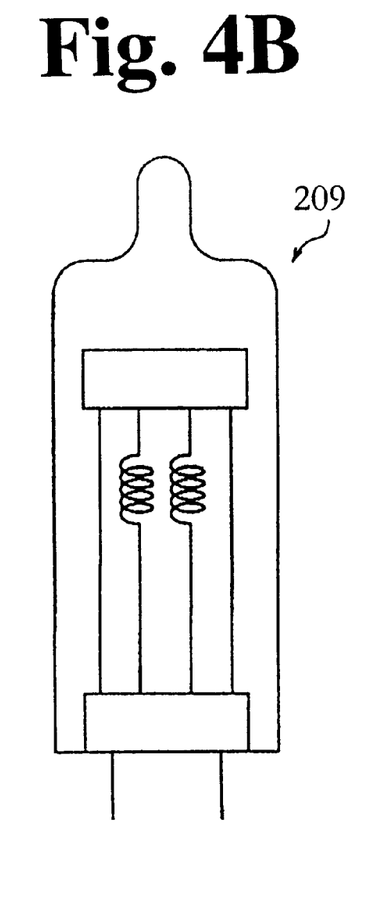
Figure 4C:
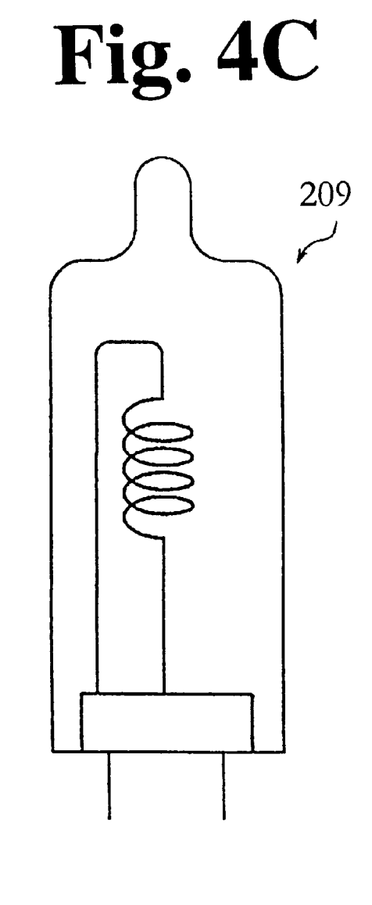

The halogen lamp 209 may employ any configuration, for example, as shown in FIGS. 4A to 4C. The halogen lamp shown in FIG. 4A has a piece of filament as an emitter section, whose longitudinal direction is formed perpendicular to the irradiation direction of the light. The halogen lamp shown in FIG. 4B has two pieces of filaments as an emitter section, whose longitudinal direction is formed to be parallel to the irradiation direction of the light. The halogen lamp shown in FIG. 4C has a piece of filament as an emitter section, whose longitudinal direction is formed to be parallel to the irradiation direction of the light. In the present embodiment, the halogen lamp having the configuration shown in FIG. 4C is most preferable. This is because the halogen lamp having a configuration shown in FIG. 4C works as an emitter nearest to an ideal point light source when viewed from the direction of the negative film, which minimizes non-uniformity in the quantity of light on the negative film.

The heat sink 210 has two functions. One is as a lampholder for supplying the halogen lamp 209 with electric power and for fixing the halogen lamp 209 to a predetermined position, and the other is as a heat sink for absorbing and releasing heat generated by the halogen lamp 209.

The reflector 211 is formed into a concave shape around the halogen lamp 209 so as to reflect the incident light from the halogen lamp 209 to irradiate the light forward (toward filter unit 204 direction) as well as to condense it. The curvature of the reflection surface of the halogen lamp 209 is designed so the reflected light is irradiated approximately over the entire first fly eye lens 205A which will be referred to later.

The reflector 211 is made of a metal such as aluminum, and a plurality of radiating fins is formed on its outer surface opposite to the reflection surface. Accordingly, the reflector 211 has an excellent configuration to absorb and release the heat generated by the halogen lamp 209. The material of the reflector 211 is not limited to that mentioned above, and it may be made up of a glass member having a reflecting surface with a dichroic mirror formed thereon, which functions to reflect visible light. When the reflector 211 made up of the glass member is compared with that made of a metal according to the present embodiment, the reflector 211 made of metal results in more stable reflection characteristics, is less expensive, and has a longer life.

In addition, since the reflector 211 and the heat sink 210 are directly connected with each other by screws or by fitting with a spring steel, the relation between the emitter point of the filament in the halogen lamp 209 and the curvature of the concave surface of the reflector 211 can be precisely controlled. Further, proper arrangement of the halogen lamp 209 and the reflector 211 can be easily determined while assembling or replacing these components. Furthermore, since the heat absorbed by the heat sink 210 can be easily transferred to the reflector 211 having high heat-releasing efficiency, the heat generated by the halogen lamp 209 can be released to make the cooling more efficient.

On the reflection surface of the reflector 211, a heat absorbing layer which functions to absorb infrared light may be disposed. This layer reduces the infrared component in the light reflected by the reflector 211.

The filter unit 204 comprises a heat reflection filter (heat reflector means) 212, first, second and third rotary plates 213, 214 and 215, a solenoid 216 for preventing the negative film from burning and a shutter 217.

The heat reflection filter 212 reflects infrared light while transmitting visible light. The present embodiment employs the heat reflection filter 212 to reflect light with a wavelength equal to or greater than 780 nm and to transmit light with a wavelength less than 780 nm.

The first, the second and the third rotary plate assemblies 213, 214, 215 modulate the light irradiated from the halogen lamp 209. The details of the first, the second and the third rotary plate assemblies 213, 214, 215 will be described later with reference to FIGS. 6A to 6C.

The solenoid 216 prevents the negative film from burning and the shutter 217, works to insert the shutter 217 into the optical path of the light from the halogen lamp 209 by operating the solenoid 216 to drive the shutter 217 for preventing the negative film from burning except during the actual process of exposing the negative film 208. This prevents the negative film 208 from being discolored by a temperature rise which may occur when the negative film 208 can not be moved out of the exposure position and it is exposed continuously to the light irradiation from the halogen lamp 209 such as when trouble in the device occurs.

Each of the first and the second fly eye lenses 205A, 205B has a structure having a plurality of micro-lenses integrally formed on a transparent substrate, and since it does not contain any opaline pigment, it is colorless and transparent. Each micro-lens has the same shape and is two-dimensionally arranged on the transparent substrate and systematically takes the focus of each lens into consideration. Each micro-lens in the first fly eye lens 205A is arranged so as to lead the incident light to the area of the second fly eye lens 205B, and each micro-lens in the second fly eye lens 205B is arranged so as to lead the incident light to an area of a first condenser lens 220.

The incident light passing through the first and the second fly eye lenses 205A, 205B having these structures is refracted and diffused on the concave and convex surfaces, and thus the incident light to the first and the second fly eye lenses 205A, 205B is dispersed by the plurality of micro-lenses. As a result, the first and the second fly eye lenses 205A, 205B have the same function as a surface light source owing to the operation of the micro-lenses. In addition, since each of the first and the second fly eye lenses 205A, 205B comprises a transparent substrate and a plurality of micro-lenses, 90 percent or more of transmittance is achieved, so that the degree of blocking the light irradiated from the light source is lowered. Thus, the first and the second fly eye lenses 205A, 205B are capable of uniformly diffusing the incident light and minimizing the reduction in the quantity of light.

The first fly eye lens 205A having the structure described above is disposed on the light outgoing side of the filter unit 204, and the second fly eye lens 205B is disposed between the first fly eye lens 205A and the cold mirror 206. Thus, by disposing these two fly eye lenses 205A and 205B, in series along the optical axis, non-uniformity of the light quantity in the light irradiated from the halogen lamp 209 can be eliminated.

In addition, a heat reflection coating may be deposited on the surface of the first and the second fly eye lenses 205A, 205B, and, with such structure, heat is further prevented from getting to the negative film 208 to make the temperature rise.

The cold mirror 206 reflects only visible light toward the negative film 208 while allowing it to transmit infrared light. The present embodiment employs a cold mirror 206 which reflects only visible light having a wavelength between 400 to 780 nm. The cold mirror 206 removes the infrared light more efficiently than, for example, the heat reflection filter 212. Thus, the infrared component in the light irradiated from the halogen lamp 209 is removed by the heat reflection filter 212 and the cold mirror 206, so that the temperature rise in the negative film 208 can be controlled so that it is sufficiently low.

On the backside of the cold mirror 206, namely on the opposite side of the reflection surface of the cold mirror 206, an anti-reflection plates 218 is disposed. The surface of the anti-reflection plate 18 facing the cold mirror 206 is honed and is additionally processed to form a black alumite (anodic oxide coating) thereon. Thereby, the infrared light transmitted through the cold mirror 206 is prevented from being reflected toward the negative film 208. The anti-reflection plate 218 also functions to prevent the infrared light transmitted through the cold mirror 206 from reaching the housing 201 and raising the temperature of a part of the housing 201 which might be touched by a user.

An opening is formed on the housing 201 through which the light passes from the cold mirror 206 to the negative film 208, and the condenser lens unit 202 is disposed in the opening. The condenser lens unit 202 comprises a cylinder 219, first and second condenser lenses (optical condenser means) 220, 221, and a diffuser plate 222. The cylinder 219 is arranged so that the center axis thereof coincides with the optical axis of the light irradiated from the cold mirror 206 to the negative film 208. On the cold mirror 206 side opening thereof the first condenser lens 220 is disposed, and on the negative film side opening thereof the diffuser plate 222 is disposed. The second condenser lens 221 is disposed in the cylinder 219 near the diffuser plate 222.

Thus, the light reflected by the cold mirror 206 is condensed by the first and the second condenser lenses 220, 221, and the condensed light is irradiated onto the negative film 208, so that the light not used to irradiate the negative film 208 can be minimized so as to efficiently irradiate light onto the negative film 208.

The diffuser plate 222 is made of ground glass and is installed in order to reduce small flaws on the negative film. The extinction coefficient of the diffuser plate 222 is around 5 to 10%, that is, the reduction of the quantity of light when the light passes through the diffuser plate 222 is small. The cooling fan unit 207 introduces external air outside the housing 201 into the inside thereof, thereby the rise in temperature in the housing 201 caused by heat from the halogen lamp 209 is limited.

The first, the second and the third rotary plate assemblies 213, 214, 215, will now be described with reference to FIGS. 6A to 6C.

Figures 6A, 6B, 6C, 6D, 6E:
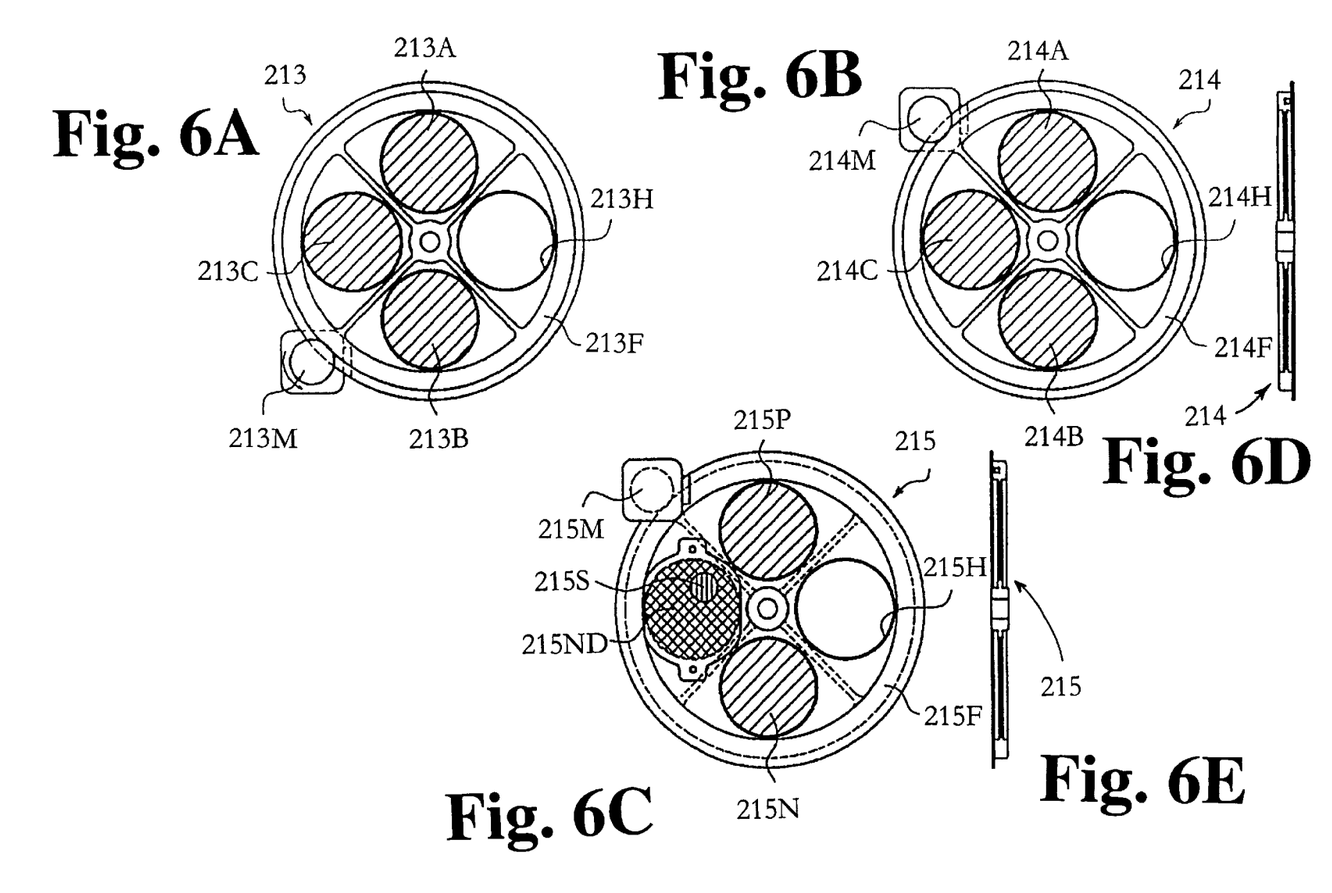

The first rotary plate assembly 213 has, as shown in FIG. 6A, a disk frame 213F, and, on respective areas thereof radially divided into quarters, a first magenta filter (hereafter referred to as M filter) 213A, a second M filter 213B, a third M filter 213C and an opening 213H formed respectively in a disk shape. A stepping motor 213M is installed so as to contact with the rim of the frame 213F, so that the frame 213F can be rotated by driving the step motor 213M. Thus, by rotating the frame 213F, the light irradiated from the halogen lamp 9 selectively passes through one of the first M filter 213A, the second M filter 213B, the third M filter 213C or the opening 213H.

Each of the first, the second and the third M filters 213A, 213B, 213C function to reduce the green color component (hereafter referred to as G light) in the incident light, and the reducing ratio of the G light of the filters is increased by about 10% in order starting from the first M filter 213A.

The second rotary plate assembly 214 has, as shown in FIG. 6B, almost the same structure as the first rotary plate assembly 213 described above, and contains a frame 214F, a first cyan filter (hereafter referred to as C filter) 214A, a second C filter 214B, a third C filter 214C, an opening 214H and a stepping motor 214M. Each of the first, the second and the third C filters 214A, 214B, 214C functions to reduce the red color component (hereafter referred to as R light) in the incident light, and the reducing ratio of the R light of the filters is increased by about 10% in order starting from the first C filter 214A.

The third rotary plate assembly 215 has, as shown in FIG. 6C, almost the same structure as the first rotary plate assembly 13 described above, and has a frame 215F, a positive filter 215P, a negative filter 215N, a set up filter 215S, a ND filter 215ND, an opening 215H and a stepping motor 215M. The set up filter 215S and the ND filter 215ND are superposed in the same area of the third rotary plate assembly 215.

The positive filter 215P functions to remove 65% of the light having a wavelength more than 640 nm from the incident light and the negative filter 215N has a function to remove 65% of the light having a wavelength between 600 and 680 nm from the incident light. The ND filter which is superposed on the set up filter 215S functions to remove 50% of overall quantity of light from the incident light, and the set up filter 215S selects a wavelength band of the light taken as a reference light. The set up filter 215S is used when, for example, the halogen lamp 9 is replaced.

A circular hole on the ND filter 215ND of FIG. 6C is provided for convenience to show the set up filter 215S disposed on the back side of the ND filter 215ND, that is, different from FIG. 6C, there is no actual hole formed on the ND filter 215ND.

The operation of the first, the second and the third rotary plate assemblies 213, 214, 215, each having the structure mentioned above, when the light irradiated from the halogen lamp 209 is modulated will now be described.

The light source device of the present embodiment is used, as described above, as a light source device for irradiating light onto the negative film 208 and for making an original image recorded on the negative film 208 to be detected by the CCD. Accordingly, the above light modulation is controlled based on the output of the CCD sensor.

The optical sensor of the CCD has generally a low sensitivity to a blue color component (hereafter referred to as B light) in the light. Therefore, the light modulation is performed by taking the B light as a reference, reducing the G light by either of the first, the second or the third M filters 213A, 213B or 213C, and reducing the R light by either of the first, the second or the third C filters 214A, 214B or 214C. When the B light is higher than a standard value, a diaphragm is disposed between the light source device and the CCD to reduce the overall quantity of light. Then the light modulation is performed. As for a method for reducing the quantity of light, the lamp voltage may be dropped or an ND filter 215ND may be inserted into the optical path.

When the negative film 208 is a normal negative film, color balance is not likely to be lost, and the above light modulation is hardly required. Such light modulation is performed so as to handle a discolored negative film or a film whose color balance has been lost.

Though the structure for detecting the original image recorded on the negative film 208 by the CCD has been described, what is detected is not limited to the negative film. The original image recorded on the positive film can also be detected by the CCD. In this case, since the positive film and the negative films differ in the wavelength band of red color, the red color component is adjusted so as to correspond to the wavelength of the respective films. Therefore, when a positive film is applied, the positive filter 215P is used, and, when a negative film is applied, the negative filter 215N is used for light modification.

On each flange portion of the frames 213F, 214F, 215F of the first, the second and the third rotary plate assemblies 213, 214, 215 a slit is formed respectively. By detecting the slit with a sensor, the direction of each frame 213F, 214F, 215F is determined; that is, the specific areas of the respective frames 213F, 214F, 215F passing the area of light from the halogen lamp 209 are detected.

The optical path in the light source device above will now be described.

The light irradiated from the halogen lamp 209 with a solid angle of 360 degrees is reflected forward by the reflector 211, and goes into the filter unit 204. In the filter unit 204, a part of the infrared ray is removed by the heat reflection filter 212 while the visible light is transmitted through the heat reflection filter 212, and then the color balance thereof is adjusted by the first, the second and the third rotary plate assemblies 213, 214, 215.

The light irradiated from the filter unit 204 is transmitted through the first fly eye lens 205A and the second fly eye lens 205B so as to be made into uniform light and then it is reflected by the cold mirror 206 toward the negative film 208. A part of the infrared light contacting the cold mirror 206 is transmitted through the cold mirror 206 and exits the optical path. The light reflected by the cold mirror 206 goes into the condenser lens unit 202. The incident light contacting the condenser lens unit 202 is transmitted through the first condenser lens 220 and the second condenser lens 221 so as to be condensed. The condensed light is transmitted through the diffuser plate 222 so as to be irradiated onto the negative film 208.

As described above, since the light source device of the present embodiment is equipped with the first and the second fly eye lenses 205A and 205B, each comprising a plurality of micro-lenses integrally formed on the surface of the transparent substrate, so as to lead the incident light into the incoming side area in the condenser lens unit 202, most of the non-uniformity in the light is removed by the first and the second fly eye lenses 205A and 205B so most of the light can be supplied to the condenser lens unit 202. Therefore, since the light is not diffused out of the necessary area, which might be caused by the conventional diffuser plate made of ground glass, resin containing opaline pigment and the like, the loss in the quantity of the light irradiated from the halogen lamp 209 can be greatly decreased.

In addition, since the light is made uniform by the first and the second fly eye lenses 205A, 205B and is condensed by the first and the second condenser lenses 220, 221 so as to be irradiated onto the negative film 208, the light can be irradiated only on the area necessary for illumination. Accordingly, this is different from the conventional method where the light diffused by the diffuser plate and irradiated onto the object to be illuminated. In the present invention, the light is not diffused out of the necessary area, so the negative film 208 can be effectively illuminated.

Moreover, light irradiated from the halogen lamp 209 is made uniform by the use of almost the entire surfaces of the first and the second fly eye lenses 205A, 205B, and then it is condensed by the first and the second condenser lenses 220, 221, so that the uniform light can be made efficiently. Although the light source device of the present embodiment is used in a structure where the original image recorded on the negative film 208 is detected by the CCD, it may be used, as described above, as a light source for printing it on a photosensitive material such as photographic printing paper. In this case, since fine light modulation is required, a traditional light modulation unit shall be employed in place of the first, the second and the third rotary plate assemblies 213, 214, 215 described above.

In the traditional light modulation unit, filters corresponding to respective colors are inserted from two directions into an optical path and the opening areas thereof are varied to modulate the light. However, since the light modulation performed by a light modulation unit having a structure where the opening area of the filter is varied is likely to cause irregularities in colors, the diffusion efficiency of the present structure is enhanced compared to that of the aforementioned light source device. For example, when another fly eye lens is added to the first and the second fly eye lenses 205A, 205B, the diffusion efficiency of the light will be further improved.

Another preferred embodiment of the present invention will be described with reference to FIG. 7.

Figure 7:
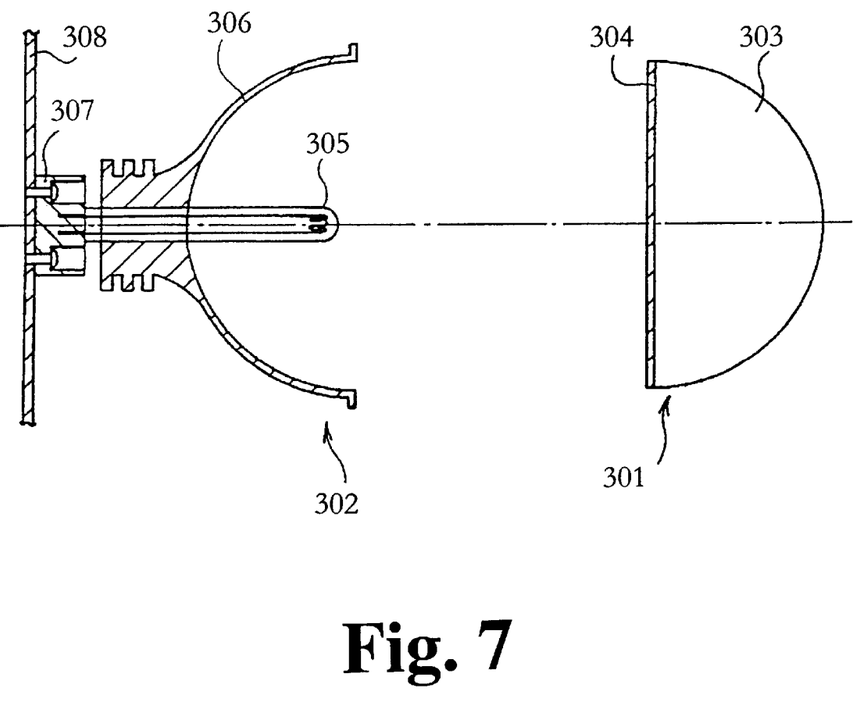
FIG. 7 is a diagrammatic illustration showing the arrangement of an optical selection filter and a light source section according to another embodiment of the present invention.

FIG. 7 is a diagrammatic illustration of an arrangement of an optical selection filter 301 and a light source section 302 according to another preferred embodiment of the present invention. The light source section 302 and the optical selection filter 301 are arranged so that light irradiated from the light source section 302 is transmitted through the optical selection filter 301.

The optical selection filter 301 comprises a condenser lens 303 and a heat reflection film 304. The condenser lens 303 is a plano-convex lens and the heat reflection film 304 is deposited on a planar surface of the condenser lens 303. The heat reflection film 304 transmits light having a wavelength equal to or shorter than visible light and reflects infrared light. The condenser lens 303 condenses the light irradiated by the light source 302.

The optical selection filter 301 is arranged so that the flat surface of the condenser lens 303, on which the heat reflection film 304 is deposited, faces the light source section 302, so that the heat reflection film 304 is disposed on the light incoming side of the condenser lens 303. Further, the optical selection filter 301 is positioned so that the optical axis of the light irradiated from the light source section 302 passes through the center of the condenser lens 303, and a line normal to the planar surface of the condenser lens 303 is parallel to the optical axis so that the optical axis of the light irradiated from the light source section 302 is not changed by passing through the optical selection filter 301.

The light source section 302 comprises a halogen lamp 305 as its light source, a reflector 306, a lampholder 307 and a light source holder 308. The reflector 306 has a mirror finished concave surface, which reflects the light from the halogen lamp 305 in a certain direction (toward the optical selection filter 301). The reflector 306 also functions as a heat sink for absorbing and releasing heat from the halogen lamp 305. The lampholder 307 supplies the halogen lamp 305 with electric power and holds the halogen lamp 305 in a predetermined position. The light source holder 308 holds the halogen lamp 305, the reflector 306 and the lampholder 307 in a predetermined position.

The optical path that the light irradiated from the halogen lamp 305 goes through will now be described.

The light irradiated from the halogen lamp 305, a part of which is reflected by the reflector 306, enters the heat reflection film 304 of the optical selection filter 301. Of the incident light reaching the heat reflection film 304, the infrared light component is reflected on the surface of the heat reflection film 304, and light having a wavelength equal to or shorter than visible light is transmitted through the heat reflection film 304 so as to be incident light passing through the condenser lens 303.

The incident light reaching the condenser lens 303 is condensed and exits the condenser lens 303 as parallel rays or convergent rays. The light irradiated out of the condenser lens 303 passes through some optical systems and a negative film (not shown) and then contacts a photosensitive material such as photographic printing paper.

As described above, of the light irradiated from the halogen lamp 305, the infrared component is reflected by the heat reflection film 304, and only light having a wavelength equal to or shorter than the visible light passes through the condenser lens 303 and into the subsequent optical systems. Thus only a small part of the infrared ray is irradiated onto the photosensitive material. Thereby, the increased temperature of the film negative and the photosensitive material can be controlled.

Another embodiment of the present invention, similar to FIG. 7, will be described with reference to FIGS. 8 and 9.

Figure 8:
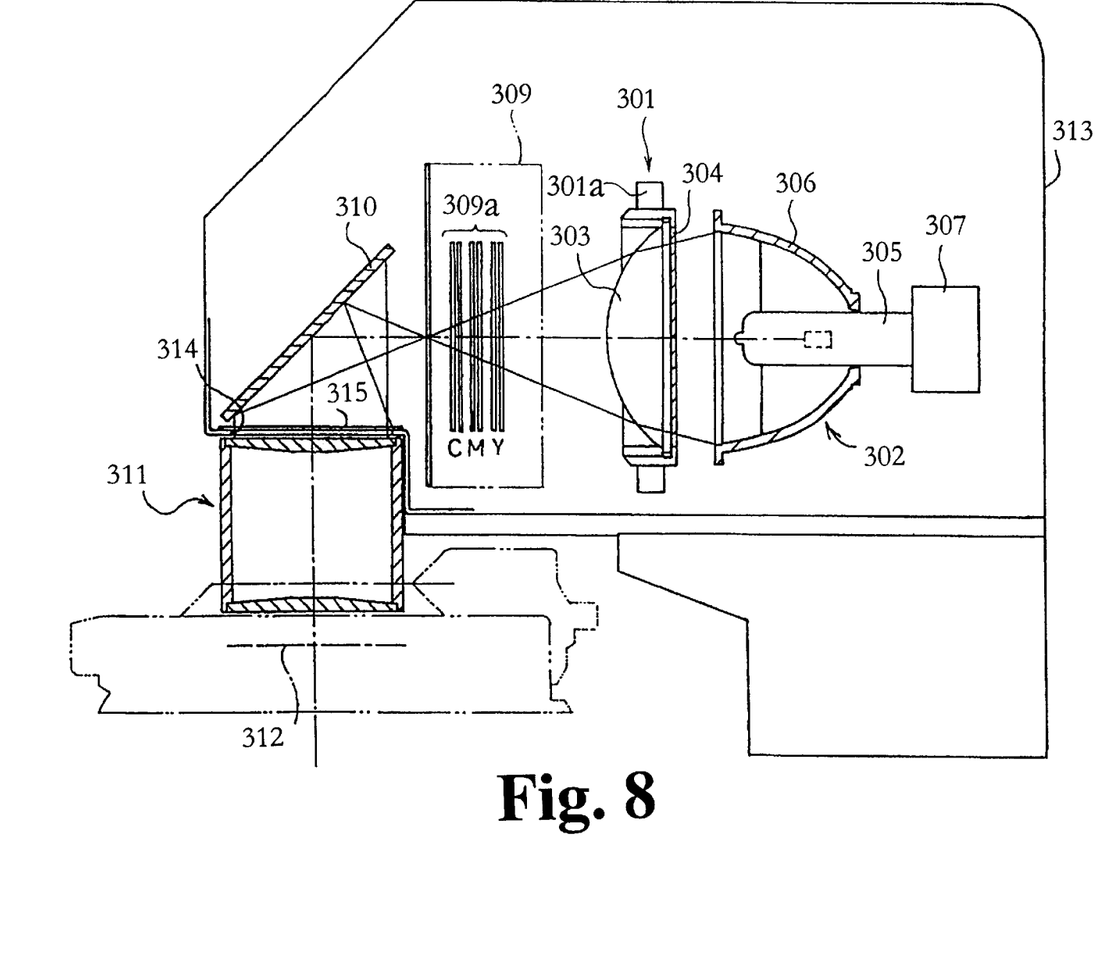
FIG. 8 is a diagrammatic illustration of the general structure of a light source having an optical selection filter according to the present invention.

FIG. 8 is a diagrammatic illustration of the general structure of a light source device equipped with an optical selection filter 301 according to an embodiment of the present invention.

The light source device has a housing 313 that acts as a lamp box. In the housing 313, there are installed a light source section 302, an optical selection filter 301, a light modulation unit 309, and a cold mirror 310. The optical selection filter 301, the light modulation unit 309 and the cold mirror 310 are arranged on an optical axis connecting the light source section 302 to a negative film 312 which has been conveyed to a predetermined position outside of the housing 313.

The light source section 302 contains a halogen lamp 305 as its light source, a reflector 306 and a lampholder 307. The reflector 306 has a mirror finished concave surface, which reflects the light from the halogen lamp 305 in a desired direction (toward the optical selection filter 301). The lampholder 307 supplies the halogen lamp 305 with electric power and holds the halogen lamp 305 in a predetermined position.

The optical selection filter 301 has a condenser lens 303 and a heat reflection film 304. The condenser lens 303 is a plano-convex lens and the heat reflection film 304 is deposited on a planar surface of the condenser lens 303.

The optical selection filter 301 is arranged so that the flat surface of the condenser lens 303, on which the heat reflection film 304 is deposited, faces the light source section 302, that is, so that the heat reflection film 304 is disposed on a light incoming side of the condenser lens 303. Further, the optical selection filter 301 is positioned so that an optical axis of the light irradiated from the light source section 302 passes through a center of the condenser lens 303. A line normal to the planar surface of the condenser lens 303 is parallel to the optical axis so that light irradiated from the light source section 302 is not to be changed by passing through the optical selection filter 301.

The condenser lens 303 having the heat reflection film 304 deposited thereon is positioned by an optical selection filter holder 301a on a predetermined place in the housing 313.

The light modification unit 309 has a light modification filter 309a for the respective colors of Y (yellow), M (magenta) and C (cyan).

The cold mirror 310 reflects only visible light toward the negative film 312 while transmitting the heat away.

An opening 314 is formed on the housing 313 so as to pass through a portion for the light from the cold mirror 310 to the film negative 312. A dust-tight glass 315 having an outer diameter slightly larger than an inner diameter of the opening 314 is disposed on an inner surface of the housing 313 so as to cover the opening 314.

Between the housing 313 and the negative film 312 and on the optical axis connecting the halogen lamp 305 to the negative film 312 a mirror tunnel 311 is disposed which diffuses the light from the halogen lamp 305 to irradiate it onto the negative film 312. This reduces the non-uniformity in exposure of the negative film 312.

The optical path, along which light irradiated from the halogen lamp 305 travels through will now be described.

The light irradiated from the halogen lamp 305, a part of which is reflected by the reflector 306, goes into the heat reflection film 304 of the optical selection filter 301. Of the incident light to reach the heat reflection film 304, the infrared light components are reflected on the surface of the heat reflection film 304, and light components having wavelengths equal to or shorter than visible light are transmitted through the heat reflection film 304 and become incident light to the condenser lens 303.

The incident light to the condenser lens 303 is condensed and exits of the condenser lens 303 as convergent rays and enters the light modulation unit 309.

The incident light entering the light modulation unit 309 is modulated to balance the respective colors of Y, M and C.

The light exiting from the light modulation unit 309 is reflected by the cold mirror 310 toward the negative film 312. A part of the heat reaching the cold mirror 310 passes through the cold mirror 310 and exits the optical path. The light reflected by the cold mirror 310 passes through the dust-tight glass 315 and the opening 314 and then enters the mirror tunnel 311.

Then the incident light in the mirror tunnel 311 is substantially uniformly diffused by the diffuser plate and by the irregular reflection of the inner mirror of the mirror tunnel 311 and it is irradiated toward the negative film 312. As a result, uniform light is irradiated onto the negative film 312 so as to minimize non-uniformity in the exposure on the surface of the negative film.

As described above, since the light source device according to the present invention has the optical selection filter 301 disposed between the light modulation unit 309 and the light source section 302, light, with its infrared components almost completely removed by the optical selection filter 301, is supplied to the light modification unit 309. Accordingly, the rise in temperature in the light modification filter 309a of the light modification unit 309 can be controlled and deterioration in the light modification function of the light modification filter 309a due to the rise in temperature can be prevented.

The light irradiated from the halogen lamp 305 is supplied to the negative film 312 after the infrared components are removed by two optical elements, that is, the optical selection filter 301 and the cold mirror 302. Therefore, since the rate of the infrared components in the light irradiated onto the negative film 312 can be made extremely low, the rise in temperature in the negative film 312 can also be made extremely low.

The light source device of the present embodiment is not limited to those described above but may employ other structures, for example, as shown below.

Figure 9:
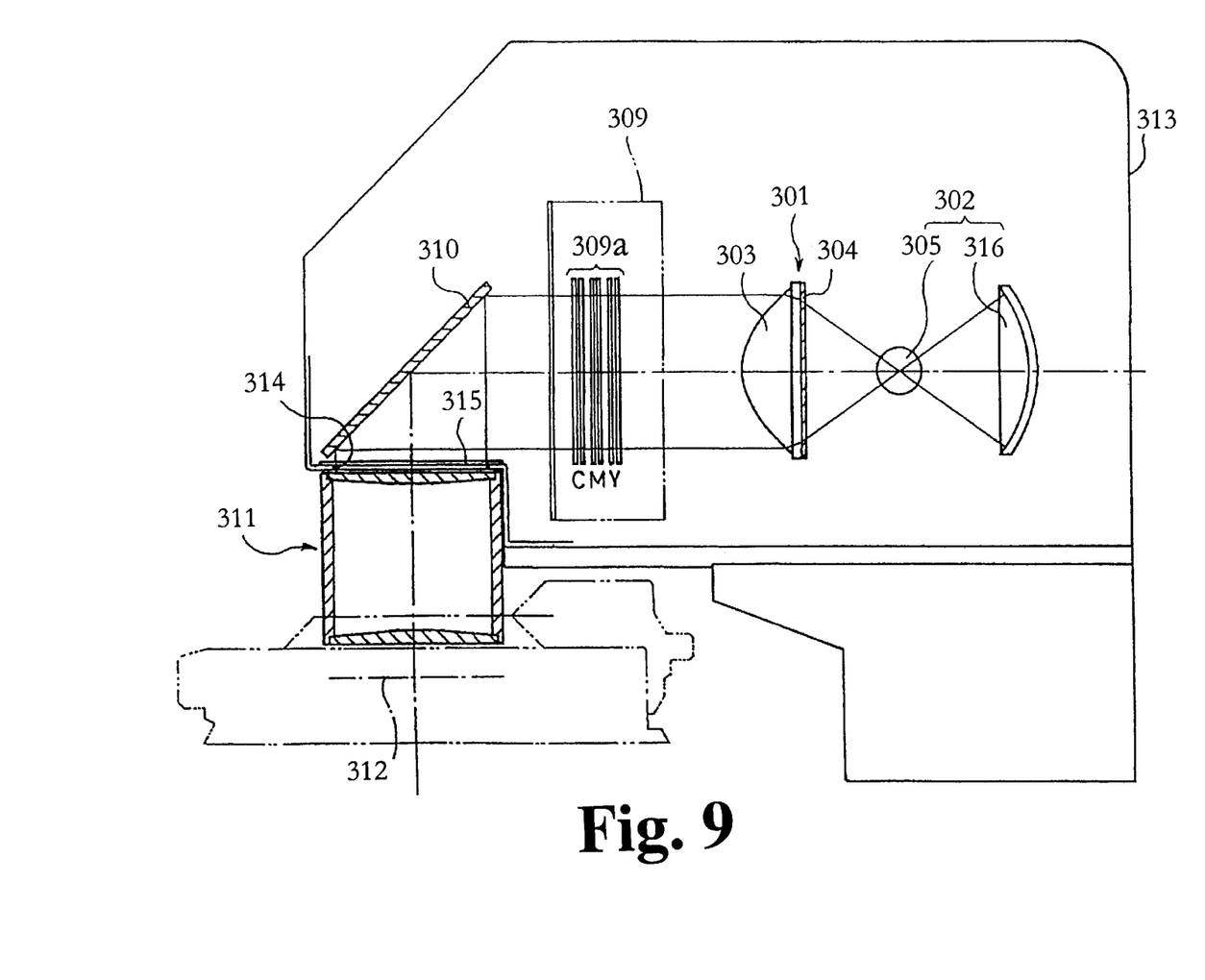
FIG. 9 is a diagrammatic illustration showing further details of a light source having an optical selection filter according to the present invention.

FIG. 9 is a diagrammatic illustration of a general structure of a light source device as an alternative example. The light source device 302 of this example comprises a halogen lamp 305 and a concave mirror 316. The halogen lamp 305 is disposed so that the longitudinal direction thereof is parallel to the direction normal to the paper of FIG. 9. That is, the halogen lamp 305 is disposed so that the longitudinal direction thereof is normal to the optical path passing through the optical selection filter 301 and the light modification unit 309.

The concave mirror 316 has a mirror finished concave surface and is placed on the opposite side of the optical selection filter 301 with respect to the halogen lamp 305. The concave surface faces toward the halogen lamp 305 so as to reflect the light irradiated by the halogen lamp 305 toward the optical filter 301.

In the structure described above, the same operation and effects obtained by the aforementioned light source device in FIG. 8 may be expected, so that an optimized structure may be employed in the housing 313 depending on the mutual arrangement of respective components.

Since the light is not diffused out of the necessary projection area, the effect of a loss in light quantity can be greatly decreased.

In addition, since the uniform light is condensed by the optical condenser means and irradiated onto the object to be illuminated, the light can be irradiated only onto the necessary area of illumination.

Further, since the light irradiated from the light source is supplied almost over the full area of the optical uniformalizer means, and is then condensed by the optical condenser means, the light can be made uniform.

Therefore, according to the structure described above, since the loss in light irradiated from the light source may be minimized, and light having a small amount of non-uniformity may be irradiated onto the object to be illuminated, a light source device capable of inducing maximum ability of the light source can be provided.

The heat reflector means adds to the effect, since most of the infrared components included in the light irradiated from the light source can be removed. Therefore the rise in temperature in the object to be illuminated can be greatly reduced.

The light source device having a structure described above, can also further comprise a reflector made of metal material for reflecting the light irradiated from the light source substantially toward a certain direction. Also, the light source can be directly fixed to the reflector. This provides an effect that the relation between the emitter point of the light source and the curvature of reflection surface of the reflector can be precisely controlled. In addition, the proper arrangement of the light source and the reflector can be easily determined while assembling or replacing these components.

Furthermore, since the heat generated by the light source can be easily transferred to the reflector having high heat-releasing efficiency, another effect is that the light source can be cooled efficiently.

It is understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A photo processing apparatus comprising:
   a light source;
   a means for making uniform light from light irradiated from said light source;
   an optical condenser means for condensing the uniform light;
   wherein said means for making uniform light comprises a plurality of micro-lenses formed on a surface of a transparent substrate so as to lead incident light into an incoming side area in said optical condenser means; and
   a heat reflector means for reflecting infrared light and transmitting visible light and a heat transmitter means for transmitting infrared light and reflecting visible light, said heat reflector means and said heat transmitter means being disposed between said light source and said optical condenser means, wherein the light transmitted through said heat reflector means and reflected by said heat transmitter means is to illuminate an object.

2. A photo processing apparatus as defined in claim 1, further comprising a reflector for reflecting the light irradiated from said light source substantially in a desired direction, wherein said reflector is connected to said light source.

3. A photo processing apparatus comprising:
   a light source;
   a means for making uniform light from light irradiated from said light source;
   an optical condenser means for condensing the uniform light; and
   an optical filter disposed between said light source and said optical condenser means, said optical filter having properties to reflect infrared light and transmit visible light,
   wherein the light transmitted through said optical condenser means and said optical filter illuminates an object; and
   said photo processing apparatus further comprising a further light filter disposed along a light path between said light source and a location for the object, said further filter being arranged to reflect visible light and transmit infrared light so as to illuminate the object.

4. A photo processing apparatus as defined in claim 3, wherein the object is a photographic film and said further filter is disposed between the photographic film and said optical condenser means.

5. A photo processing apparatus as defined in claim 3, wherein said means for making uniform light comprises a plurality of micro-lenses formed on a surface of a transparent substrate so as to lead incident light into an incoming side area in said optical condenser means.

6. A photo processing apparatus as defined in claim 4, wherein said means for making uniform light comprises a plurality of micro-lenses formed on a surface of a transparent substrate so as to lead incident light into an incoming side area in said optical condenser means.

* * * * *